(12) United States Patent
Firestone

(10) Patent No.: US 7,535,995 B1
(45) Date of Patent: May 19, 2009

(54) SYSTEM AND METHOD FOR VOLUME INDICATION DURING A COMMUNICATION SESSION

(75) Inventor: Scott Firestone, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1023 days.

(21) Appl. No.: 10/059,675

(22) Filed: Jan. 29, 2002

(51) Int. Cl.
*H04M 1/64* (2006.01)
(52) U.S. Cl. .................. 379/80; 370/248; 375/259; 705/14; 709/204
(58) Field of Classification Search ................ 370/248, 370/267, 349; 709/204, 231; 379/15.05, 379/80; 375/259; 700/24; 705/14
See application file for complete search history.

(56) References Cited

U.S. PATENT DOCUMENTS

| | | | | |
|---|---|---|---|---|
| 5,539,741 A | * | 7/1996 | Barraclough et al. | 370/267 |
| 5,726,984 A | * | 3/1998 | Kubler et al. | 370/349 |
| 5,966,427 A | * | 10/1999 | Shaffer et al. | 379/15.05 |
| 6,272,182 B1 | * | 8/2001 | Dijkmans | 375/259 |
| 6,807,562 B1 | * | 10/2004 | Pennock et al. | 709/204 |
| 6,996,068 B1 | * | 2/2006 | Sherlock | 370/248 |
| 2006/0242315 A1 | * | 10/2006 | Nichols | 709/231 |

OTHER PUBLICATIONS

Series T: Terminal Equipments and Protocols for Telematic Services, Data Protocols for Multimedia Conferencing, *International Telecommunication Union*, ITU-T Telecommunication Standardization Sector of ITU—T.120 (Previously CCITT Recommendation), Jul. 1996.
Series H: Audiovisual and Multimedia Systems, Infrastructure of Audiovisual Services—Systems and Terminal Equipment for Audiovisual Services, Packet-Based Multimedia Communications Systems, *International Telecommunication Union*, ITU—T Telecommunication Standardization Sector of ITU—H.323, Nov. 2000.

* cited by examiner

*Primary Examiner*—Gerald Gauthier
(74) *Attorney, Agent, or Firm*—BAker Botts L.L.P.

(57) ABSTRACT

A method for volume indication during a communication session includes detecting analog audio at a telephony device. First communication packets are transmitted from the telephony device indicating that the analog audio is being received. The analog audio is encoded to a digital audio stream and second communication packets comprising the digital audio stream are transmitted from the telephony device. In accordance with a particular embodiment, the first communication packets indicate an approximate volume level of the analog audio. The method may also include receiving, at the telephony device, analog video. The analog video is converted to a digital video stream. The digital video stream may be transmitted from the telephony device.

38 Claims, 2 Drawing Sheets

SYSTEM AND METHOD FOR VOLUME INDICATION DURING A COMMUNICATION SESSION

TECHNICAL FIELD OF THE INVENTION

This invention relates generally to the field of packet-based communication networks, and more specifically to a system and method for volume indication during a communication session.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network. However, the integration of telecommunications and data transmissions is still ongoing, and many features that were available to users of traditional telecommunications networks have not been made available to users of VoIP and similar technologies.

Audio and/or video streaming across a communication network may encounter delays that diminish the advantages of real-time communications. If the delay increases beyond an acceptable level, it becomes difficult for users to take turns talking, since one user may not know that another user has begun speaking. As a result, both users may begin speaking at approximately the same time. When this happens, both users soon become aware that they are stepping on each other's words, and both stop talking believing they are allowing the other to finish. After both users stop talking, they will frequently repeat this cycle one or more times, causing more speech stomping (interruptions) to occur. In some extreme cases, the only way to conduct an effective communication session is to communicate as if using walkie-talkies (each participant indicates when they are finished speaking by saying "over").

SUMMARY OF THE INVENTION

The present invention includes a system and method for volume indication during a communication session that substantially eliminates or reduces disadvantages or problems associated with previously developed systems and methods. In particular, the present invention contemplates transmitting communication packets to a receiving endpoint(s) indicating that a user at a sending endpoint is speaking. Such packets may be received at the receiving endpoint before the audio itself is received.

In accordance with a particular embodiment of the present invention, a method for volume indication during a communication session includes detecting analog audio at a telephony device. First communication packets are transmitted from the telephony device indicating that the analog audio is being received. The analog audio is encoded to a digital audio stream. Second communication packets comprising the digital audio stream are transmitted from the telephony device. In some embodiments, the first communication packets may indicate an approximate volume level of the analog audio.

In accordance with another embodiment of the present invention, analog video is received at the telephony device. The analog video is converted to a digital video stream. The digital video stream may be transmitted from the telephony device.

In accordance with yet another embodiment, a method for volume indication during a communication session includes receiving a data stream including volume indication associated with an analog audio stream detected at a transmitting telephony device. A digital audio stream which comprises an encoded version of the analog audio stream is also received. The volume indication is displayed at a user interface on the receiving telephony endpoint. The method further includes decoding the digital audio stream. In accordance with a particular embodiment, an analog representation of the digital audio stream is played at the user interface.

Technical advantages of the present invention include a system and method for volume indication during a communication session between telephony devices. An indication that volume has been received at a transmitting telephony device is transmitted to a receiving telephony device. Accordingly, a user of the receiving telephony device is aware that a user of the transmitting telephony device has begun speaking, before receiving the audio stream. This prevents a situation in which the user at the receiving telephony device begins speaking before receiving the audio signal from the transmitting telephony device (e.g., interrupting the speaker).

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
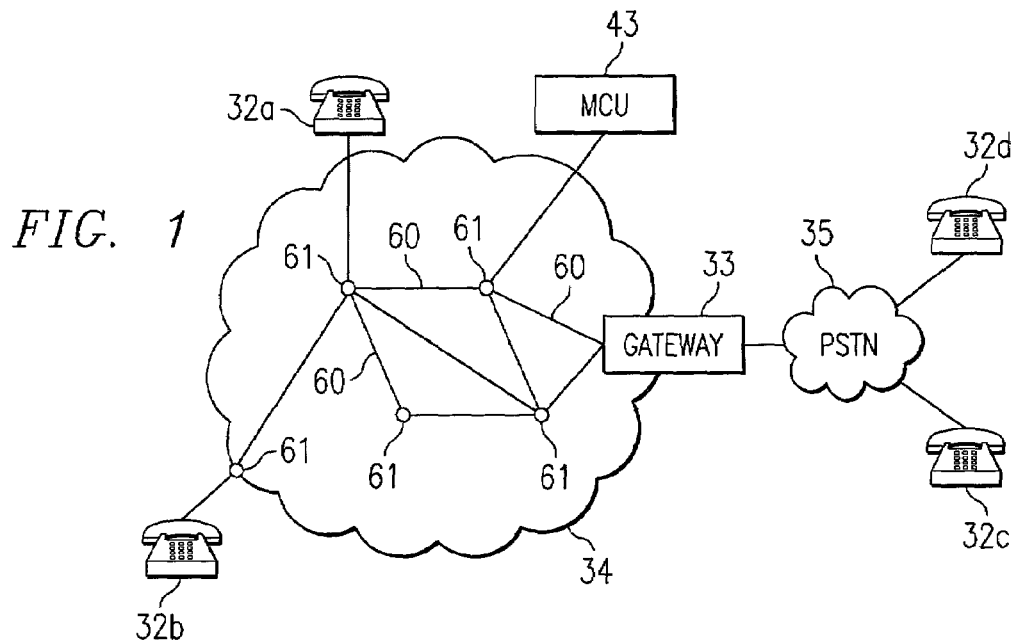
FIG. 1 illustrates a communications network in accordance with a particular embodiment of the present invention.

FIG. 1 illustrates a communication system 30 that includes a plurality of endpoints 32a-32d (generally referred to as endpoints 32), that establish communication sessions between and/or among each other using communication network 34. In accordance with the present invention, a system (s) and method(s) is provided that allows users of endpoints 32 to detect a speaker at another endpoint 32, before hearing the speaker's voice. This allows the user at the receiving endpoint to avoid speaking over the speaker at the other endpoint and "stepping on," or interrupting the speaker.

When delay is experienced in the audio stream(s) of a conversation between two or more endpoints 32, it is often difficult to conduct a real-time conversation, since user's who are unaware that other users have begun speaking will interrupt and begin speaking themselves. The present invention mitigates the effect of delay in an audio channel by employing a system and/or method whereby a transmitting endpoint transmits a data stream separate from the audio stream. The data stream contains data indicating the volume level of audio received at a microphone coupled with the transmitting endpoint 32. The volume level may be displayed at the receiving endpoint in the form of a visual volume indicator. The data stream having the volume level is significantly less susceptible to delay for reasons to be discussed later, in more detail. Therefore, the receiving endpoint 32 is likely to receive the data stream before receiving the audio stream. This allows a user of the receiving endpoint to determine when a user at another endpoint has begun speaking, before receiving the audio stream and/or hearing the user's voice.

Endpoints 32 may be any combination of hardware and/or software that provide communication services to a user. For example, endpoints 32 may be a telephone, a computer running telephony software, a video monitor, a camera, or any other communication or processing hardware, software and/or embedded logic that supports the communication of packets of media using network 34. Endpoints 32 may also include unattended or automated systems, gateways, multipoint control unit (MCU) other intermediate components, or other devices that can establish media sessions. Although FIG. 1 illustrates four endpoints 32, communication system 30 contemplates any number and arrangement of endpoints 32 for communicating media. Furthermore, the described technologies and techniques for establishing a communication session between endpoints 32 may be adapted to establish a multipoint conference between more than two endpoints 32.

Although a specific communication network 34 is illustrated in FIG. 1, the term "communication network" should be interpreted as generically defining any network capable of transmitting audio and/or video telecommunication signals, data, and/or messages. Network 34 may be a local area network (LAN), wide area network (WAN), global distributed network such as the Internet, Intranet, Extranet, or any other form of wireless or wireline communication network. Generally, network 34 provides for the communication of packets, cells, frames, or other portions of information (generally referred to as packets) between endpoints 32. Network 34 may include any combination of gateways, routers, hubs, switches, and other hardware and/or software implementing any number of communication protocols that allow for the exchange of packets in communication system 30.

Any given communication session between two of endpoints 32 will include the transfer of packets across one or more communication paths, each of which include a plurality of segments 60 and nodes 61. Therefore, communication network 34 includes a plurality of segments 60 and nodes 61 that couple endpoints 32 across communication network 34. Nodes 61 may include any combination of network components, gatekeepers, call managers, routers, hubs, switches, gateways, endpoints, or other hardware, software, or embedded logic implementing any number of communication protocols that allow for the exchange of packets in communication system 30. Each segment 60 and the respective nodes 61 or other communication devices it couples include a finite capacity of network resources (e.g. bandwidth) available to a communication session between endpoints 32. At any given time, a portion of such network resources may be dedicated to one or more existing communication sessions and less than the entire capacity of network resources may be available for a particular communication session.

In a particular embodiment, network 34 employs communication protocols that allow for the addressing or identification of endpoints 32 coupled to network 34. For example, using Internet protocol (IP), each of the components coupled together by network 34 in communication system 30 may be identified in information directed using IP addresses. In this manner, network 34 may support any form and/or combination of point-to-point, multicast, unicast, or other techniques for exchanging media packets among components in communication system 30. Although the subsequent description will primarily focus on IP telephony devices, it should be understood that other appropriate telephony devices, such as Voice over Frame Relay devices, are also included within the scope of this description.

Network 34 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 34 may also be coupled to non-IP telecommunication networks through the use of gateway 33. For example, network 34 is coupled to Public Switched Telephone Network (PSTN) 35. PSTN 35 includes switching stations, central offices, mobile telephone switching offices, pager switching offices, remote terminals, and other related telecommunications equipment that are located across the country.

IP networks transmit data (including voice and video data) by placing the data in packets and sending each packet individually to the selected destination. Unlike a circuit-switched network (like PSTN 35), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32 are IP telephony devices. IP telephony devices have the capability of encapsulating a user's voice (or other inputs) into IP packets so that the voice can be transmitted over network 34. Similarly, IP telephony devices 32 have the capability of capturing and encapsulating video into IP packets so that the video can be transmitted over network 34. Conversely, IP telephony devices 32 have the capability of receiving audio or video IP packets from the network 34 and playing the audio or video data to a user.

A codec (coder/decoder) 46 (FIG. 2) at the endpoint 32 converts the voice, video or fax signals generated by the users of the telephony devices from analog media signals into digital form. The codec may be implemented either in software or as special-purpose hardware in endpoints 32. In the case of an IP telephone, as the user speaks into the handset, the codec converts the analog voice signals into digital data. The digitally encoded data is then encapsulated into IP packets so that it can be transmitted over network 34. Conversely, a codec 46 (FIG. 2) at the endpoint 32 converts the digital data into analog media for the users of the telephony devices. In the case of an IP telephone, digital data from IP encapsulated packets are received from the network 34. A codec 46 at the endpoint 32 converts the digital voice, video or fax data from the network 34 into analog media to be played to the users of the telephony devices.

Gateway 33 accomplishes several things. For example, gateway 33 may convert analog or digital circuit-switched data transmitted by PSTN 35 to packetized data transmitted by network 34, and vice-versa. When voice data packets are transmitted from network 34, gateway 33 retrieves the data contained in the incoming packets and converts this digital data to the analog or digital format used by the PSTN trunk to which gateway 33 is coupled. Since the digital format for voice transmissions over an IP network is often different than the format used on the digital trunks of PSTN 35, the gateway provides conversion between these different digital formats, which is referred to as transcoding. Gateway 33 also translates between the VoIP call control system and other signaling protocols (e.g., SS7, T1, ISDN, etc.), used in PSTN 35.

For voice transmissions from PSTN 35 to network 34, the process is reversed. In a particular embodiment, gateway 33 takes the incoming voice transmission (in either analog or digital form) and converts it into the digital format used by network 34. The digital data is then encapsulated into IP packets and transmitted over network 34.

Network 34 also includes a multipoint control unit (MCU) 43. MCU 43 is used to conduct telephone conferences between two or more endpoints 32. For example, MCU 43 may be used to broadcast a message from one to several endpoints. However, MCU 43 may also be used when more than two users associated with separate endpoints intend to participate in the conference.

Figure 2:
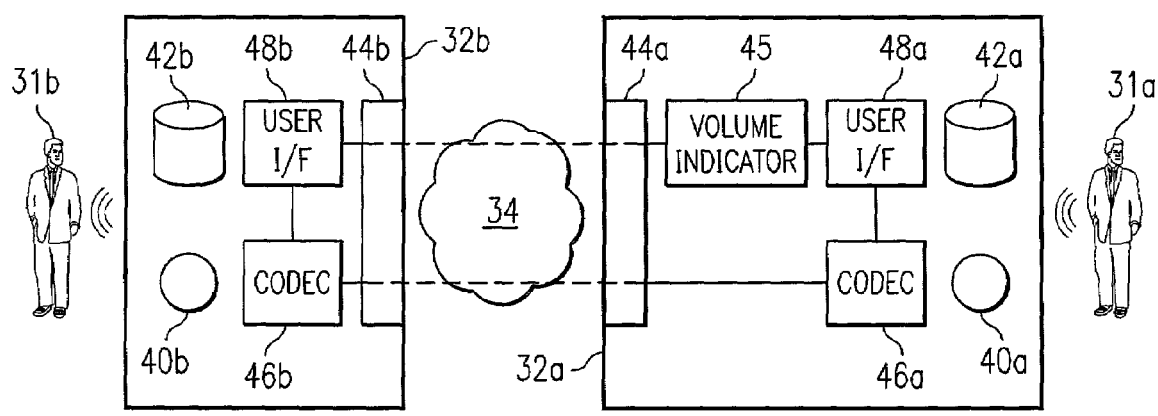
FIG. 2 illustrates a communication session between users of telephony devices, in accordance with a particular embodiment of the present invention.

FIG. 2 illustrate a communication session between endpoints 32a and 32b using network 34. Since endpoints 32a and 32b include similar components and functionality, it should be recognized that all endpoints 32 coupled with network 34 may include the components and functionality described with regard to endpoint 32a and/or 32b. Endpoint 32a includes a processor 40, a memory 42, a network interface 44, and a codec 46. Endpoint 32a also includes a user interface 48, which may include a microphone, video camera, speaker, and/or video display. In accordance with another embodiment, user interface 48 may be coupled with components that include a microphone, video camera, speaker and/or video display, rather than incorporating such components into endpoint 32a. Endpoint 32b includes similar components having similar functionality.

For the purposes of this specification, a communication session will be described between endpoints 32a and 32b in which a user 31a is communicating audio and video to user 31b. However, it should be recognized that the present invention is applicable to two-way communication sessions involving two or more parties communicating audio, video, or both.

During a communication session between endpoints 32a and 32b, user 31a generates analog audio (e.g., speech) that is captured by a microphone at user interface 48a. The analog audio is transmitted to codec 46a where the analog audio is digitized for transmission across network 34. The digitized audio is transmitted to network interface 44a and transmitted across network 34 as a plurality of packets which include the digitized audio. A stream of such packets may be referred to as a digital audio stream.

The digital audio stream is received at network interface 44b, and transmitted to codec 46b, where the digital audio stream is decoded and transmitted to user interface 48b. User interface 48b plays the decoded audio stream in an analog format, to user 31b. Although delays may be encountered in the transmission of the analog audio stream received at user interface 48a until it is played by user interface 48b to user 31b, the communication is considered "real-time".

In many instances, user interface 48a will also capture video generated by user 31a at a video camera coupled with or integral to user interface 48a. The analog video captured by user interface 48a is transmitted to codec 46a, digitized, and transmitted to user interface 44a, packetized, transmitted across network 34 as a digital video stream, received at network interface 44b, decoded by codec 46b and played to user 31b by user interface 48b. Delays may be encountered during this process, but the communication of video is considered "real-time". In general, and for reasons to be discussed below and others generally apparent to those skilled in the art, the delays associated with the transmission of video are typically greater than delays associated with the transmission of audio.

The real-time nature of a communication session between users of two or more endpoints 32 is preserved as long as the delay in the audio stream from one endpoint 32a to another endpoint 32b is kept below an acceptable level (e.g., below 150 ms). If the delay increases beyond the acceptable level, it becomes difficult for users to take turns talking, since one user may not know that another user has begun speaking. As a result, both users may begin speaking at approximately the same time. When this happens, both users soon become aware that they are stepping on each other's words, and both stop talking believing they are allowing the other to finish. After both users stop talking, they will frequently repeat this cycle one or more times, causing more speech stomping (interruptions) to occur. In some extreme cases, the only way to conduct an effective communication session is to communicate as if using walkie-talkies (each participant indicates when they are finished speaking by saying "over").

Delay may be introduced or added into audio and/or video communications for several reasons, or a combination of such reasons. For example, the transmitting endpoint 32a and the receiving endpoint 32b may have inherent latencies. These latencies are often caused by slow processors, buffering requirements, and/or the particular protocol(s) being used by one or more of the endpoints 32. Buffering requirements often require the transmitting device to capture and/or buffer an entire frame of video or an entire block of audio, before it transmits. In one embodiment, the smallest size of an audio block that will be transmitted is 30 ms. Delay may also be introduced or increased due to latency involved in encoding the audio and/or video at the transmitting endpoint, and/or decoding the audio and/or video data at the receiving endpoint.

Latency in the transmission channel is another factor that may increase delay into the communication session. Such latencies may be caused by the specific path traveled by the communications packets, the number and type of nodes, routers, MCUs or other network components that handle network traffic, failure of network components, capacity of the network and associated components and/or the amount of traffic being experienced within the network.

The particular size of communication packets used, as measured in time duration, of the transmission protocol may cause delay. This is true because larger packets require more time to buffer, before the data can be transmitted and/or processed. Also, when data is sent in packetized format over a network, each receiving network node, including the MCU, may need to buffer a certain amount of data to prevent network jitter from causing the input buffers to underflow.

In many instances, a network node (e.g., MCU) will receive data in different formats, particularly if the data is received from different network components. This may require the node to convert each data stream to a common format before the data can be combined. This process is called transcoding, and may add latency into audio and/or video data streams.

When a communication session includes both audio and video, audio data and video data are often transmitted separately, and combined at the receiving endpoint. This may require synchronization at the receiving end, which can introduce delay into the communication session. Typically, video data has a longer end-to-end latency than audio data. Accordingly, the audio stream is frequently delayed at the receiving end in order to synchronize the audio stream with the video stream.

The teachings of the present invention provide a system and method for alerting users participating in a communication session, that audio is being sent from one of the endpoints before the audio arrives. In many instances, the volume stream will arrive ahead of the audio and/or video communication from other endpoints. The volume stream will usually travel through the network faster than audio and/or video, for reasons discussed below.

The volume stream may be sent over a transmission channel, independent of the audio and/or video stream. Many steps may be taken in order to reduce the latency (delay) of the volume stream through the network.

There is no jitter buffer for the volume stream, since jitter is not an issue with this type of data. Instead, the volume stream may be generated/transmitted as soon as audio is detected at endpoint 32a. Accordingly, buffer delay(s) associated with any one or more of the network components may be eliminated for the volume stream.

Also, there is very little latency needed to generate or display the volume data. For example, at the transmitting endpoint (endpoint 32a), the volume stream may comprise very little data that needs to be packetized. Similarly, very little data regarding the volume stream is received at the receiving endpoint(s). The data of the volume stream may be simply a binary (ON or OFF) indicator. However, even if an analog volume level indicator is used, the amount of data needed to be transmitted is very small relative to the audio stream or the video stream. Accordingly, very little processing power and/or time is needed to generate, transmit, receive, read and/or display the data from the volume stream. For similar reasons, the size of the communication packets used to transmit the volume stream, as measured in time, can be made small relative to communication packets of the audio or video stream.

Also, there is very little latency needed to encode or decode the volume stream. Since the volume stream includes very little data, encoding and decoding may not be required. However, even if the volume stream is encoded at the transmitting endpoint and decoded at the receiving endpoint(s), very little processing power and/or time are required to accomplish this.

In many embodiments, the volume stream will not need to be transcoded. This eliminates or substantially reduces latency at a node (e.g., MCU) communicating between endpoints that employ different protocols. Also, unlike the audio stream and video stream, the volume stream does not need to be synchronized with any other stream of data. This also reduces latency and processing power, and therefore, time involved in transmitting, receiving and/or displaying the volume stream data.

Figure 3:
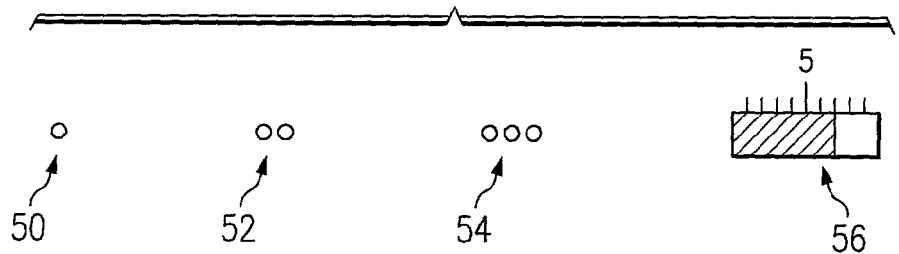
FIG. 3 illustrates various methods for displaying volume indication, in accordance with the present invention.

FIG. 3 indicates several types of volume indicators that may be incorporated into user interface 48b, to illustrate that a user is speaking at endpoint 32a. For example, the indication may be as simple as a red light which is on when volume is detected at endpoint 32a, and off when no volume is detected. This type of indicator may be considered binary, since the light is either on or off. This information may be transmitted to user interface 48b using a single bit of information (e.g., "1" for on, "0" for off). In a similar manner, a binary representation could be used with two indicator lights 52, and one could be lighted if volume is received, and the other lighted when no volume is being received.

A trinary representation may also be used, such as three light system 54. In this manner, a red light could be used to indicate that no volume is detected. A green light may indicate that volume is being detected. A yellow light could also be employed to indicate that some volume is being detected, but that it is very slight (e.g., background noise) and may not necessarily mean that someone is speaking.

In another embodiment, an analog bargraph 56 may be used to show an actual relative volume of the audio being received at endpoint 32a. The bargraph could be incorporated into a telephony device, or displayed on a computer monitor associated with user interface 48b. In any case, the amount of data that would be sent as the volume stream would be substantially smaller than the amount of data associated with the audio and/or video stream(s).

Figure 4:
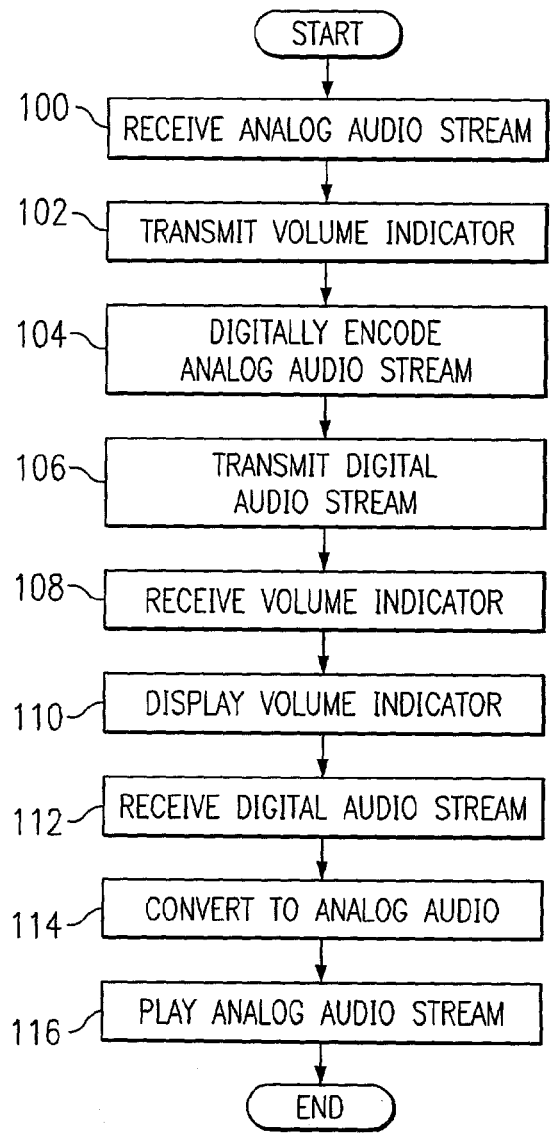
FIG. 4 illustrates a method for volume indication during a communication session, in accordance with a particular embodiment of the present invention.

FIG. 4 illustrates a method for volume indication during a communication session, in accordance with a particular embodiment of the present invention. At step 100, an analog audio stream is received at endpoint 32a. An analog audio stream refers to sound that is received at user interface 48a, for example a speaker's voice. When the analog audio stream is detected by volume indicator 45, a volume indication is transmitted to endpoint 32b, at step 102. The volume indication may comprise communication packets including information regarding the existence or level of volume being received, depending upon the type of volume indicator that is being used at the receiving endpoint 32b (See FIG. 3 for types). Throughout this specification, the volume indication may be referred to as a data stream, or volume stream. The volume indication may refer to any type of data that is transmitted to receiving endpoint 32b to indicate that volume is being received at endpoint 32a, and/or characteristics of that volume. The volume indication specifically excludes data associated with the digitized audio stream (streaming audio) and data associated with the video stream (streaming video). At step 104, the analog audio stream is digitally encoded, such that the digital audio stream (streaming audio) may be transmitted to endpoint 32b, at step 106.

The volume indicator is received by endpoint 32b, at step 108. Upon receipt of the volume indication, or volume stream, user interface 48b displays the presence of audio at endpoint 32a, at step 110. This alerts user 31b that user 31a is speaking, and that user 31b can expect to receive audio within the next few seconds, or sooner.

The volume stream will usually arrive ahead of the streaming audio and/or video, for several reasons, many of which were described above. The volume stream may be routed through network 34 according to an entirely different path than audio and/or video streams. For example, a shorter path may be selected for the volume stream intentionally, to get the volume there relatively faster. Although shorter routes often involve additional expense, the additional expense would be minimal, since the size of the packets of the volume stream are small.

In accordance with a particular embodiment of the present invention, the network nodes 61 may give priority to the volume stream. For example, the communication packets associated with the volume stream may include an indication to an MCU or a router that such packets should be given a high priority, in order to transmit the volume stream faster. Alternatively, when an MCU is used, the volume stream need not be routed through the MCU. Instead, the volume stream could take a different communication path (e.g., transmission channel) than the audio and/or video streams. In order to protect against dropped packets of the volume stream over an unreliable protocol, changes in the volume indication can be sent redundantly.

The streaming audio is received by endpoint 32*b* at step 112. The streaming audio is converted to an analog audio stream at step 114, and played to user 31*b* at step 116.

Additional references include:

ITU-T Recommendation T.120: Data Protocols for Multimedia Conferencing International Telecommunication Union. July 1996.

ITU-T Recommendation H.323: Packet-Based Multimedia Communication Systems. International Telecommunication Union. February 1998.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for audio indication during a communication session, comprising:
   detecting analog audio at a telephony device;
   transmitting first communication packets from the telephony device indicating that the analog audio is being received;
   encoding the analog audio to a digital audio stream; and
   transmitting, from the telephony device, second communication packets comprising the digital audio stream.

2. The method of claim 1, wherein the first communication packets indicate an approximate volume level of the analog audio.

3. The method of claim 1, further comprising:
   receiving, at the telephony device, analog video;
   converting the analog video to a digital video stream; and
   transmitting, from the telephony device, the digital video stream.

4. The method of claim 3, further comprising:
   synchronizing the digital audio stream and the digital video stream; and
   wherein the digital video stream is transmitted using third communication packets.

5. The method of claim 4 further comprising buffering the digital audio stream.

6. The method of claim 1, wherein:
   transmitting the first communication packets comprises transmitting the first communication packets over a first transmission channel;
   transmitting the second communication packets comprises transmitting the second communication packets over a second transmission channel; and
   the first transmission channel having a generally lower average latency with respect to the second transmission channel.

7. The method of claim 6 wherein the first communication packets conform to a T.120 protocol and the second communication packets conform to an H.323 protocol.

8. The method of claim 1, wherein the first communication packets include a binary representation of a volume of the analog video.

9. The method of claim 1, wherein the first communication packets include a trinary representation of a volume of analog audio.

10. The method of claim 1, wherein the first communication packets include an analog representation of a volume of the analog audio.

11. The method of claim 6, wherein the second transmission channel passes through a multipoint control unit (MCU) and the first transmission channel does not pass through the MCU.

12. The method of claim 6, wherein the first and second communication packets are transmitted to an MCU, and the MCU gives the first communication packets a higher priority than the second communication packets.

13. The method of claim 1, wherein the first communication packets are sent redundantly.

14. The method of claim 1, wherein the first communication packets are transmitted using an unreliable protocol, and the second communication packets are transmitted using a reliable protocol.

15. The method of claim 1, wherein the first communication packets are transmitted along a first communication path and the second communication packets are transmitted along a second communication path, and wherein the first communication path is faster than the second communication path.

16. A method for volume indication during a communication session, comprising:
   receiving a data stream including volume indication associated with an analog audio stream detected at a transmitting telephony device;
   receiving a digital audio stream which comprises an encoded version of the analog audio stream;
   displaying the volume indication at a user interface;
   decoding the digital audio stream; and
   playing an analog representation of the digital audio stream at the user interface.

17. The method of claim 16, further comprising:
   receiving a digital video stream;
   synchronizing the digital audio stream with the digital video stream; and
   playing the digital video stream at the user interface.

18. The method of claim 17, further comprising buffering the digital audio stream.

19. A volume indicating telephony device, comprising:
   a user interface operable to receive analog audio;
   a volume detector operable to detect the analog audio;
   a processor being operable to encode the analog audio into a digital audio stream;
   a network interface being operable to transmit a first plurality of communication packets including an indication that the volume has been received; and
   the network interface being further operable to transmit a second plurality of communication packets including the digital audio stream.

20. The telephony device of claim 19, wherein:
   the user interface is further operable to receive analog video;
   the processor is further operable to encode the analog video into a digital video stream; and
   the network interface is further operable to transmit the digital video stream.

21. The telephony device of claim 20, wherein the processor is further operable to synchronize the digital audio stream and the digital video stream, and wherein the digital video stream is transmitted using third communication packets.

22. The telephony device of claim 21, further comprising a buffer being operable to buffer the digital audio stream.

23. A volume indicating telephony device, comprising:
   a network interface operable to receive a data stream including volume indication associated with an analog audio stream detected at a transmitting telephony device;

the network interface being further operable to receive a digital audio stream which comprises an encoded version of the analog audio stream;

a user interface being operable to display the volume indication to a user;

a processor being operable to decode the digital audio stream; and the user interface being further operable to play an analog representation of the digital audio stream to the user.

24. The telephony device of claim 23 further comprising:

the user interface being further operable to receive a digital video stream;

the processor being further operable to synchronize the digital audio stream and the digital video stream; and the user interface being further operable to play the digital video stream at the user interface.

25. The telephony device of claim 24 further comprising a buffer being operable to buffer the digital audio stream.

26. Computer readable media encoded with logic for audio indication, the logic being operable, when executed by a computer, to perform the following steps:

detect analog audio at a telephony device;

transmit first communication packets from the telephony device indicating that the analog audio is being received;

encode the analog audio to a digital audio stream; and transmit, from the telephony device, second communication packets comprising the digital audio stream.

27. The computer readable media encoded with logic of claim 26 wherein the logic is further operable to perform the following steps:

receive, at the telephony device, analog video;

convert the analog video to a digital video stream; and transmit, from the telephony device, the digital video stream.

28. The computer readable media encoded with logic of claim 27 the logic being further operable to perform the following steps:

synchronize the digital audio stream and the digital video stream; and wherein the digital video stream is transmitted using third communication packets.

29. The computer readable media encoded with logic of claim 28 wherein the logic is further operable to buffer the digital audio stream.

30. The computer readable media encoded with logic of claim 26 wherein the logic is further operable to perform the following steps:

transmit the first communication packets over a first transmission channel;

transmit the second communication packets over a second communication channel; and the first transmission channel having a generally lower average latency with respect to the second transmission channel.

31. Computer readable media encoded with logic for volume indication during a communication session, the logic being operable, when executed by a computer, to perform the following steps:

receive a data stream including volume indication associated with an analog audio stream detected at a transmitting telephony device;

receive a digital audio stream which comprises an encoded version of the analog audio stream;

display the volume indication at a user interface;

decode the digital audio stream; and play an analog representation of the digital audio stream at the user interface.

32. The computer readable media encoded with logic of claim 31, the logic being further operable to perform the following steps:

receive a digital video stream;

synchronize the digital audio stream and the digital video stream; and play the digital video stream at the user interface.

33. A system for audio indication during a communication session, comprising:

means for detecting analog audio at a telephony device;

means for transmitting first communication packets from the telephony device indicating that the analog audio is being received;

means for encoding the analog audio to a digital audio stream; and means for transmitting, from the telephony device, second communication packets comprising the digital audio stream.

34. The system of claim 33, further comprising:

means for receiving, at the telephony device, analog video;

means for converting the analog video to a digital video stream; and means for transmitting, from the telephony device, the digital video stream.

35. The system of claim 34, further comprising:

means for synchronizing the digital audio stream and the digital video stream; and wherein the digital video stream is transmitting using third communication packets.

36. The system of claim 33, further comprising:

means for transmitting the first communication packets over a first transmission channel;

means for transmitting the second communication packets over a second communication channel; and the first transmission channel having a generally lower average latency with respect to the second transmission channel.

37. A system for volume indication during a communication session, comprising:

means for receiving a data stream including volume indication associated with an analog audio stream detected at a transmitting telephony device;

means for receiving a digital audio stream which comprises an encoded version of the analog audio stream;

means for displaying the volume indication at a user interface;

means for decoding the digital audio stream; and means for playing an analog representation of the digital audio stream at the user interface.

38. The system of claim 37, further comprising:

means for receiving a digital video stream;

means for synchronizing the digital audio stream with the digital video stream; and means for playing the digital video stream at the user interface.

* * * * *